(12) United States Patent
Montesin et al.

(10) Patent No.: US 12,297,955 B2
(45) Date of Patent: May 13, 2025

(54) SUPPORT LEG

(71) Applicant: CLEMSEVEN HOLDINGS PTY LTD, Artarmon (AU)

(72) Inventors: Charles Montesin, Ettalong Beach (AU); Michael Abelev, Rose Bay (AU); Takeshi Shiozaki, Kawasaki (JP)

(73) Assignee: CLEMSEVEN HOLDINGS PTY LTD (AU)

( * ) Notice: Subject to any disclaimer, the term of this patent is extended or adjusted under 35 U.S.C. 154(b) by 113 days.

(21) Appl. No.: 18/003,728

(22) PCT Filed: Jun. 30, 2021

(86) PCT No.: PCT/AU2021/050692
§ 371 (c)(1),
(2) Date: Dec. 29, 2022

(87) PCT Pub. No.: WO2022/000032
PCT Pub. Date: Jan. 6, 2022

(65) Prior Publication Data
US 2023/0304629 A1   Sep. 28, 2023

(30) Foreign Application Priority Data
Jun. 30, 2020   (AU) ................................ 2020902197

(51) Int. Cl.
*F16M 11/32* (2006.01)
*F16M 11/28* (2006.01)
*G03B 17/56* (2021.01)

(52) U.S. Cl.
CPC ............. *F16M 11/32* (2013.01); *F16M 11/28* (2013.01); *G03B 17/561* (2013.01); *F16M 2200/027* (2013.01); *F16M 2200/028* (2013.01)

(58) Field of Classification Search
CPC .. F16M 11/32; F16M 11/28; F16M 2200/027; F16M 2200/028; G03B 17/561
See application file for complete search history.

(56) References Cited

U.S. PATENT DOCUMENTS

| 3,589,757 | A |   | 6/1971  | Mooney |
|---|---|---|---|---|
| 4,247,069 | A | * | 1/1981  | Kurz .................... F16M 11/242 248/636 |
| 4,650,145 | A |   | 3/1987  | Natzel et al. |
| 6,050,531 | A |   | 4/2000  | Wilcox |
| 6,152,638 | A |   | 11/2000 | Lindsay |
| 6,913,231 | B2 | * | 7/2005 | Speggiorin ............ F16M 11/32 403/109.5 |

(Continued)

FOREIGN PATENT DOCUMENTS

WO    2020058981 A1    3/2020

*Primary Examiner* — Anita M King
(74) *Attorney, Agent, or Firm* — The Belles Group, P.C.

(57) ABSTRACT

According to the present invention, there is provided a support device and a support leg for supporting a camera or other device. The support leg includes a primary leg portion and a secondary leg portion. The secondary leg portion is in movable engagement with the primary leg portion for movement between an open configuration where the support leg is fully extended, and a closed configuration where the support leg is fully closed. A latch mechanism is further provided for automatically locking the position of the secondary leg portion relative to the primary leg portion upon reaching the closed configuration.

19 Claims, 3 Drawing Sheets

(56) References Cited

U.S. PATENT DOCUMENTS

| | | | |
|---|---|---|---|
| 9,004,419 B2* | 4/2015 | Nakatani | F16M 11/2014 248/178.1 |
| 9,417,508 B2* | 8/2016 | Yang | F16M 11/32 |
| 10,288,196 B2* | 5/2019 | Hu | F16L 9/14 |
| 10,859,202 B2* | 12/2020 | Wilson | F16M 11/28 |
| 11,441,589 B1* | 9/2022 | Ravnaas | F16B 7/1454 |
| 2004/0000622 A1 | 1/2004 | Crain et al. | |
| 2004/0206879 A1 | 10/2004 | Steyn et al. | |
| 2006/0175484 A1* | 8/2006 | Wood | F16M 11/32 248/177.1 |
| 2008/0224000 A1 | 9/2008 | Yang | |
| 2009/0206226 A1* | 8/2009 | Forrest | A47C 3/20 248/354.6 |
| 2009/0250567 A1* | 10/2009 | Raynaud | F16M 11/16 248/168 |
| 2018/0324360 A1* | 11/2018 | Gabrielli | F16M 11/16 |
| 2019/0360634 A1 | 11/2019 | Hatch | |

* cited by examiner

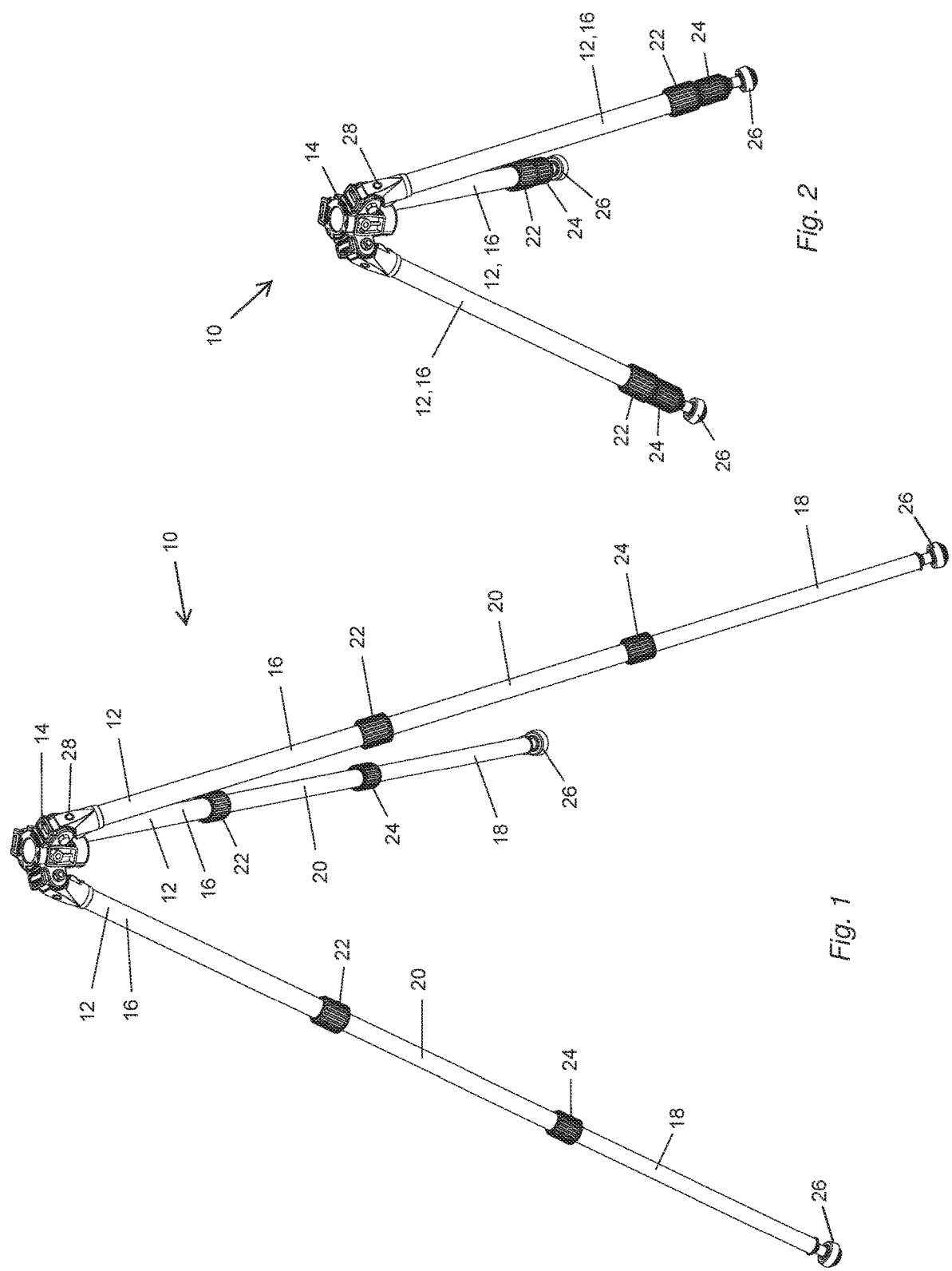

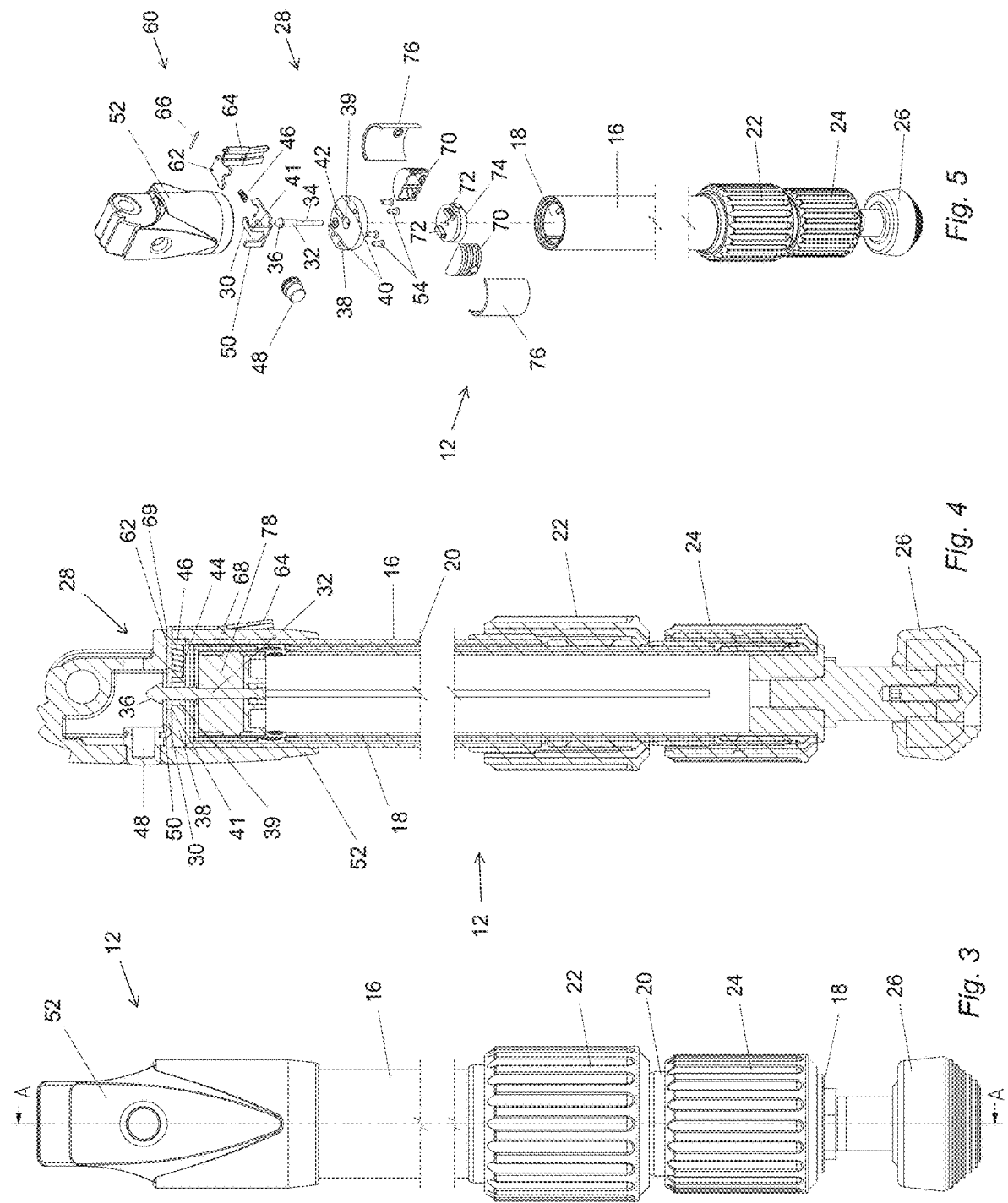

SUPPORT LEG

CROSS-REFERENCE TO RELATED PATENT APPLICATIONS

The present application is a U.S. national stage application under 35 U.S.C. § 371 of PCT Application No. PCT/AU2021/050692, filed Jun. 30, 2021, which claims priority to Australian Patent Application No. 2020902197, filed Jun. 30, 2020. The disclosures of the aforementioned priority applications are incorporated herein by reference in their entireties.

TECHNICAL FIELD

This invention relates to a support leg, and in particular, to a quick setup and collapse of support leg for supporting a still or video camera.

The invention has been developed as quick setup support leg for a camera tripod or monopod and will be described hereinafter with reference to this application. However, it will be appreciated that the invention is not limited to this particular field of use.

BACKGROUND

The following discussion of the prior art is intended to place the invention in an appropriate technical context and enable the associated advantages to be fully understood. However, any discussion of the prior art throughout the specification should not be considered as an admission that such art is widely known or forms part of the common general knowledge in the field.

Support devices such as monopods, bipods, tripods or quadpods are typically used for supporting still and/or video cameras during use. Their primary function is to support the camera weight and maintain its position thereby minimising unintentional movement during image and/or video capture. As known by those in the art, monopods consist of a single support leg, bipods include two legs and a quadpod consists of four legs. Of more common use, however, is a tripod, which includes three support legs to provide a self-supporting frame. In all cases, the support legs used are usually composed of two or more telescopically engaging tubular members, which slidably move between a fully extended and a fully closed configuration we the smaller members are nested within the larger member. Positional clamps, or other locking mechanisms, are normally provided on the tubular members so that the relative positions between adjacent members can be positionally locked at any point along their relative slidable engagement. In this way, each support leg may be locked at any length between its fully extended and fully closed configuration to allow the desired height of the tripod to be selectably achieved.

For context, the typical setup of a support leg used the above-mentioned support devices will now be described. In this respect, starting from the closed configuration, which is the normal state during which these support devices are transported, to expand each support leg, each positional clamp is unlocked. The lowermost tubular member is then extended to its desired position relative to the adjacent member and locked in position by reapplying each positional clamp. The support device is then ready for use. In a similar way, to fully collapse each support leg after use, a user is required to unlock each positional clamp, collapse each tubular member and then reapply each positional clamp so that the tubular members do not inadvertently slide out of each other during transit.

One problem with setting up these support devices is that the action of releasing the positional clamps prior to extending of each support leg can be time consuming. Subsequently, the action of applying the positional clamps after collapsing each support leg can also be a time-consuming process. Both actions also require a large degree of bending over or raising of the support device to access the positional clamps, which may be difficult for some.

It is an object of the present invention to overcome or ameliorate at least one of the disadvantages of the prior art, or to provide a useful alternative.

SUMMARY OF THE INVENTION

According to one aspect, the present invention provides a support leg for supporting a camera or other device, the support leg including:
 a primary leg portion;
 a secondary leg portion in movable engagement with the primary leg portion for movement between an open configuration where the support leg is fully extended, and a closed configuration where the support leg is fully closed; and
 a latch mechanism, wherein movement of said secondary leg portion to said closed configuration activates said latch mechanism thereby automatically locking the position of said secondary leg portion relative to said primary leg portion to maintain said closed configuration.

In one embodiment, the latch mechanism includes a release button for unlocking the position of the secondary leg portion relative to the primary leg portion when in the closed configuration.

In one embodiment, the latch mechanism includes a latch plate disposed in one of the leg portions. Preferably, the latch mechanism includes a finger member axially extending from one of the leg portions, the finger member being engageable with the latch plate. More preferably, the latch plate is laterally movable between a rest state and an actuated state. Even more preferably, the latch mechanism includes a spring for biasing the latch plate into the rest state.

In one embodiment, the finger member includes an elongate shaft extending to a head formation.

In one embodiment, the latch plate includes a finger aperture, the finger member being resiliently and slidably engageable with the finger aperture as the secondary leg portion approaches the closed configuration.

In one embodiment, upon reaching the closed configuration, the elongate shaft is received by the finger aperture the tapered head formation substantially rests against the latch plate thereby retaining the finger member with respect to the latch plate In one embodiment, upon actuation of the release button the latch plate moves from the rest state to the actuation state. Preferably, in the actuation state, the tapered head formation no longer rests against the latch plate thereby no longer retaining the finger member respect to the latch plate.

In one embodiment, the latch plate is disposed at one end of the primary leg portion, and wherein the finger member axially extends from one end of the secondary leg portion.

In one embodiment, the support leg includes a lever mechanism for unlocking the position of the secondary leg portion relative to the primary leg portion when in the closed configuration. Preferably, the lever mechanism is engageable with the latch plate.

In one embodiment, the support leg includes one or more supplemental leg portions disposed between the primary and secondary leg portions. Preferably, the support leg includes one or more locking clamps for locking the relative positions of adjacent leg portions.

According to one aspect, the present invention provides a tripod including:
a base;
three of the support legs as described above, the support legs being in hinged engagement with the base.

In one embodiment, the base includes an angularly rotatable rotor. Preferably, the rotor includes three circumferentially and equally spaced actuation lugs radially extending from its outer surface, wherein each lug is engageable with one lever mechanism upon rotation of the rotor. More preferably, the rotor includes a spring for resiliently biasing the rotation of the rotor.

According to one aspect, the present invention provides a monopod including a support leg as described above.

According to one aspect, there is provided a camera stand including one or more support legs as described above.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

DESCRIPTION OF FIGURES

Preferred embodiments of the invention will now be described, by way of example only, with reference to the accompanying drawings in which:

FIG. 1 is a perspective view of a tripod including a support leg according to one embodiment of the present invention;

FIG. 2 is a perspective view of the tripod from FIG. 1 but with each support leg in a closed configuration;

FIG. 3 is a front view of one of the support legs of the tripod of FIG. 1;

FIG. 4 is a cross sectional side view of one of the support legs along line 4-4 of FIG. 3;

FIG. 5 is a perspective view of the support leg of FIG. 3, showing the latch mechanism dissembled;

DESCRIPTION OF PREFERRED EMBODIMENTS

Figure 7:
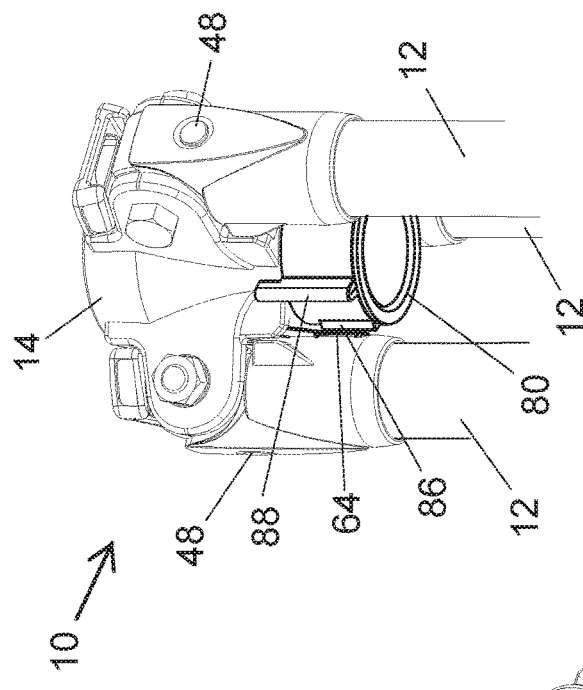
FIG. 7 is a part perspective view of the tripod of FIG. 1 in a packed configuration.

Exemplary embodiments of the present invention will now be described in detail with reference to the accompanying drawings. In the drawings, the same elements are denoted by the same reference numerals throughout. In the following description, detailed descriptions of known functions and configurations incorporated herein have been omitted for conciseness and clarity.

With reference to the accompanying drawings and initially to FIG. 1, there is provided a support device in the form of a tripod 10 supporting a still or video camera. As is known in the art, the illustrated tripod 10 may also be used to support other equipment such as rifles, lights, fans, or optical stations used by surveyor, without departing from the scope of the invention.

Figure 6:
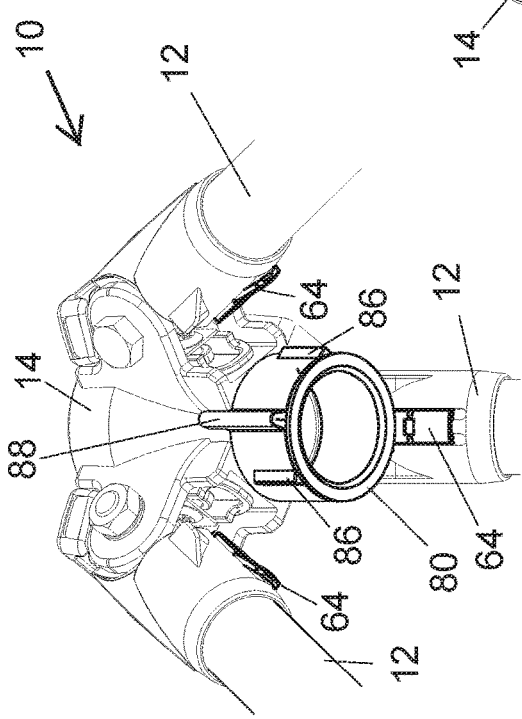
FIG. 6 is a part perspective view of the tripod of FIG. 1 in a splayed configuration.

The tripod 10 includes three support legs 12, each leg being hingedly engaged with a base 14 to be movable between a self-supporting splayed configuration as shown in FIGS. 1, 2 and 6 and a packed configuration shown in FIG. 7, where the support legs 12 are rotated inwardly until they contact the base 14. In other applications, a support leg 12 of the present invention is used in singular form for a monopod, or a bipod having two support legs 12, or even a quadpod having four support legs 12.

As is commonly known in the art, in one embodiment, a mounting plate (not shown) may be fixedly connected to the base 14. The mounting plate is also removably engageable with a still or video camera, to support the camera in a stable position above a surface during camera use. In some applications, a pivot mechanism is further provided so that the camera is rotatable about the longitudinal and/or horizontal axes to allow it to be movable during camera use. In further applications, movement using the pivot mechanism may be biased in one or more directions and may also be damped to minimise sharp movements during use.

Returning to FIG. 1, in order for the tripod of the illustrated embodiment to have a variable height, each support leg 12 includes two or more leg portions in relative moveable engagement with each other. In the illustrated embodiment, each support leg 12 includes a primary leg portion 16, a secondary leg portion 18, and an intermediate leg portion 20 positioned between the primary and secondary leg portions.

The illustrated leg portions are in the form of tubular nesting members, each member being in telescopic sliding engagement with an adjacent member. The leg portions are therefore movable between an open configuration, where each support leg 12 is fully extended as shown in FIG. 1, and a closed configuration, where each support leg 12 is fully closed as shown in FIG. 2.

It should be appreciated that by way of the telescopic nesting engagement, the secondary leg portion 18 is directly insertable into the intermediate leg portion 20. The intermediate leg portion 20 is in turn, directly insertable into the primary leg portion 16. As is known in the art, the construction of each leg portion only allows travel as far as a full insertion into the adjacent leg portion.

As is known in the art, to typically achieve the closed configuration using this arrangement, the secondary leg portion 18 is inserted into the intermediate leg portion 20 until it reaches the end of its travel, at which point, the intermediate leg portion 20 will begin to insert into the primary leg portion 16. Alternatively, the intermediate leg portion 20 it is inserted into the secondary leg portion 18, followed by the secondary leg portion 18 being inserted into the primary leg portion 16. In most cases, a user will simply grasp the far end of the secondary leg portion and push it up so that the secondary and intermediate leg portions insert all the way into the primary leg portion to achieve the closed configuration.

In the illustrated embodiment, a first locking clamp 22 is provided at the lower end of the primary leg portion 16 for locking the position of the intermediate leg portion 20 relative to the primary leg portion 16. Similarly, a second locking clamp 24 is provided at the lower end of the intermediate leg portion 20 for locking the position of the secondary leg portion 18 relative to the intermediate leg portion 20. A grip stop 26 is screwingly engaged to the distal end of each secondary leg portion 18 for improved purchase with a ground surface. By screwing into and out of the secondary leg portions, each grip stop has the ability to provide fine adjustment to the extended length of each support leg 12.

To extend each support leg 12 from the closed configuration shown in FIG. 2, to either the open configuration shown in FIG. 1, or any length in between the closed and open configurations, the first locking clamp 22 and the second locking clamp 24 are disengaged either simultaneously or consecutively. Each leg portion is then pulled out, or allowed to drop under its own weight, to the desired length. Alternatively, individual extensions of the relevant leg portion may be achieved by first disengaging the relevant locking clamp and extending the leg portion as required. Once fully extended, the locking clamps are then reengaged to lock the leg portions and the support leg 12 at a selected length.

To collapse each support leg from the open configuration shown FIG. 1 to the closed configuration shown in FIG. 2, a user again disengages the first and second locking clamps and then pushes the lower secondary leg portion 18 towards the upper primary leg portion 16. By doing so, the secondary leg portion 18 inserts into the intermediate leg portion 20 and the intermediate leg portion 20 inserts into primary leg portion 16. Once the support leg 12 is fully collapsed it has achieved the closed configuration.

Normally, to retain each support leg 12 in the closed configuration, where the secondary leg portion 18 is fully inserted into the intermediate leg portion 20 and the intermediate leg portion 20 is fully inserted into the primary leg portion 16, the first lock clamp 22 and second locking clamp 24 are reengaged. However, according to the present invention, the reengaging of the locking clamps is not required as the closed configuration is automatically achieved even if the first lock clamp 22 and second locking clamp 24 are disengaged. More specifically, to achieve this function according to the invention, a latch mechanism 28 has been provided to automatically lock the position of the secondary leg portion 18 relative to the upper primary leg portion 16 once the closed configuration is achieved. Further, due to the engagement between the secondary leg portion 18 and the intermediate leg portion 20, the intermediate leg portion will also automatically lock in position once the secondary leg portion 18 is locked relative to the primary leg portion 16. In this way, using the support leg 12 of the present invention, the step of reengaging the first locking clamp 22 and the second locking clamp 24 is not required to retain the leg portions in the closed configuration.

It should be appreciated that whilst only three leg portions are shown in the illustrated embodiment, the invention is equally applicable to more than three leg portions.

Referring now to FIGS. 3 to 5 to describe the automatic locking operation, the latch mechanism 28 includes a slidable latch plate 30 which is engageable with a finger member 32 upon reaching the closed configuration. As discussed with more detail below, the position of latch plate 30 maintained at one end of the primary leg portion 16, and finger member 32 is retained in position with respect to the secondary leg portion 18.

As best shown in FIGS. 4 and 5, the latch plate 30 includes a finger aperture 41, and laterally retained by guide portions 40 to be slidably mounted within a slide pate 38. Slide plate 38 includes a slot 42 for receiving spring tab 44, which orthogonally protrudes from the underside of the latch plate 30, and a central aperture 39. A spring 46 is also housed within slot 42 and acts on spring tab 44 to bias spring tab 44 and latch plate 30 towards one end of slot 42.

A release button 48 is engaged with a button tab 50, which orthogonally extends from the outer side of the latch plate 30. Th arrangement is such that, upon actuation of the release button, latch plate 30 moves along slide plate 38 thereby compressing spring 46. It can therefore be appreciated that due to the biasing force provided by spring 46, release button 48 is always in an extended position. This extended position of the release button generally defines the rest state of the latch mechanism 28.

As best shown in cross-section in FIG. 4, in this rest state, due to the biasing force provided by spring 46, finger aperture 41 will be out of concentric alignment with central aperture 39 in slide plate 38, but with some overlap between the two apertures. However, upon actuation of release button 48, the finger aperture 41 will be move to into alignment with the central aperture 39 to define an actuation state of the latch mechanism 28.

The latch plate 30, slide plate 38, spring 46, and release button 48 are retained in position within a tubular cap head 52 using fasteners 54. Cap head 52 is positioned over the proximal end of primary leg portion 16 and is retained thereon using an adhesive or any other fastening means as known in the art.

According to the illustrated embodiment, the latch mechanism 28 further includes a secondary actuation lever subassembly 60. The secondary actuation lever subassembly 60 includes a link plate 62 pivotally connected to a lever member 64 at one end by way of pin 66. The lever member 64 is hingedly engaged with the outside of cap head 52 via hinge joint 68. The link plate 62 enters cap head 52 through a slot 69 to connect and engage with the latch plate 30 at its other end, so that upon actuation of lever member 64, latch plate 30 will move towards the lever member and again compress spring 46 to again define the actuation state of the latch mechanism 28. It can therefore be appreciated that actuation of release button 48 and lever member 64 result in the same movement of latch plate 30.

Finger member 32, which includes stepped shaft 34 and a tapered head formation 36, is fixedly engaged to the proximal end of the secondary leg portion 18. To achieve this engagement, opposed clamp members 70 have been provided, which slidably engage with rails 72 of a disc member 74. By way of this engagement, both clamp members 70 clamp onto one end of the finger member 32. Opposed cover plates 76 have also been provided to snap-lockingly engage with the outer surfaces of the clamp members 70 and define a finger subassembly 78. Finger subassembly 78 is positioned and retained to the proximal end of the tubular secondary leg portion 18, by an adhesive means as is known in the art. It should be appreciated that the clamping force by the claim members 70 is provided subsequent to subassembly 28 being positioned within the proximal end of secondary leg portion 18. Accordingly, finger member 32 is fixed to, and protrudes from, the centre of the proximal end of secondary leg portion 18 and will travel with the secondary leg portion as it is moved from the open configuration to the closed configuration.

In operation, as the support leg 12 moves from an open configuration to the closed configuration, intermediate leg portion 20 will move through primary leg portion 16, and secondary leg portion 18 will move through both intermediate leg portion 20 and primary leg portion 16 until finger member 32 reaches central aperture 39 of slide plate 38. Finger member 32 will then pass through central aperture 39 to reach finger aperture 41 in the latch plate 30. However, since latch plate 30 is biased in a rest state, finger aperture 41 will be out of concentric alignment with central aperture 39 and continued travel of the finger member will result in tapered head formation 36 contacting one side of finger aperture 41. Further movement of the finger member 42 will then move latch member 30 laterally, sliding along slide plate 38 away from its rest state and towards its actuation state, until the tapered head formation 36 moves past the latch plate 30. Once this has occurred, the latch plate 30 will spring back onto finger member 32 to restrain finger member 32 and the secondary leg portion 18 in position due to head formation 38 resting against the latch plate 30. As best shown in FIG. 4, the closed configuration of support leg 12 is achieved at this point and secondary leg portion 18 and the intermediate leg portion 20 will be unable to be moved away until release button 48 is actuated to move latch plate 30 to the actuated state. Similarly, further movement of the secondary leg portion 18 into the primary leg portion 16 will also not be possible.

When release button 48 is actuated, the latch mechanism 28 will move to the actuation state resulting in latch plate laterally moving and finger aperture 41 aligning with central aperture 39 to release finger member 32. This allows the secondary leg portion 18 to move away from primary leg portion 16. Similarly, actuation of lever member 64 will result in the latch plate 30 moving to release the finger member 32 from its retained position. At this point and subject to the first lock clamp 22 and second lock clamp 24 being disengaged, the user can pull out and extend the leg portions, or the leg portions can fall out under their own weight, to achieve the support leg 12 length as required. The first lock clamp 22 and the second lock clamp 24 are then re-engaged to hold the support leg 12 at the desired length.

Figure 8:
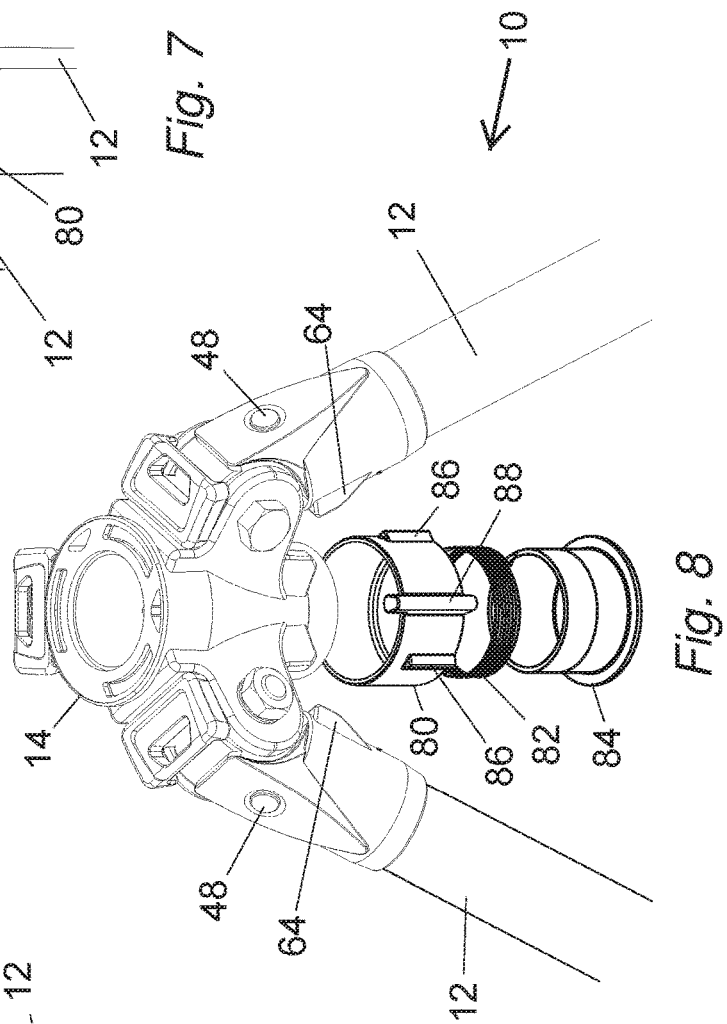
FIG. 8 is a part perspective view of the tripod of FIG. 1 in a splayed configuration and also showing the lower rotor assembly disassembled.

With reference now to FIGS. 6 to 8, as mentioned earlier, tripod 10 of the illustrated embodiment includes three support legs 12 each being hingedly engaged with a base 14. In FIG. 6, the tripod is shown with the three legs 12 in a splayed configuration. In FIG. 7, the legs are shown in a closed or packed configuration, and in FIG. 8, the tripod is again in a splayed configuration but with the base 14 partly dissembled.

According to a further aspect of the invention, base 14 includes a rotor 80 rotatably engaged with its underside. In the illustrated embodiment, rotor 80 is angularly movable between two positions generally of no more than 120°. Rotor 80 includes a rotation spring 82 for limited and biased angular rotation, and rotor cap 84 for retaining the rotor 80 and spring 82 in position. Rotor 80 includes three circumferentially and angularly equally spaced actuation lugs 86 radially extending from its outer surface. Lugs 86 are spaced such that upon rotation of rotor 80, each lug will align with and contact a respective lever member 64 on each support leg 12 but only when the support legs are in their packed configuration shown in FIG. 7. In order to achieve smooth engagement with each lever member 64, lugs 86 include tapered lead-in portions or may be chamfered. To allow convenient user grip of rotor 80, an actuation arm 88 is further provided for typical engagement with a user's thumb.

Accordingly, once the tripod is in the packed configuration shown in FIG. 7, a user simply rotates rotor 80 such that each lug contacts each of the three levers 64. Actuation of the levers results in each respective latch plates 30 being moved in each latch mechanism 28 to the latched configuration (shown in FIGS. 4 and 5.). This, in turn, results in the release of each finger member 32 in each support leg 12 thereby simultaneously releasing each secondary leg portion 18 and allowing each support leg to reach its open configuration. In this way, whilst it is still possible, a user does not need to engage each of the release buttons 48 and all of the support legs 12 can be released in one motion.

It is proposed that each leg portion is formed from any rigid and durable hollow material such as, but not limited to, steel, aluminium, plastics, or carbon fibre material or a combination thereof. Moreover, while the leg portions are depicted as circular tubular concentric and nesting members adapted for telescopic this engagement, in other embodiments, the leg portions could be any profile or even non-tubular axial members in movable sliding engagement. Under these circumstances, similar latching/release of leg portions as described above will be utilised.

In other not shown embodiments, the latch mechanism 28 may take different forms to achieve the automatic locking upon reaching the closed configuration. In a further embodiment, the latch mechanism may include a laterally movable and spring biased ball or rounded pin disposed at one end of the secondary leg portion 18. The ball or round pin would engage with an aperture at one end of the primary leg portion 16 to lock the relative addition of secondary leg portion upon reaching closed configuration. A release button would then be engageable to move the ball or pin away from the aperture to unlock the secondary leg portion from the primary leg portion. The latch mechanism of this embodiment may be formed differently to the previously described illustrated embodiment, however, it will achieve the same function. Under the circumstances, however, the secondary actuation provided by secondary actuation lever subassembly 60 will not be possible.

In a further embodiment, the leg portions may be in relative pivotal engagement with each other such as to define a scissor lift support leg arrangement. Under these circumstances, a further latch mechanism is provided that automatically locks the lowermost leg portion with the upper most leg portion upon reaching a closed configuration.

Returning to the illustrated embodiment, in use and initially from the closed configuration shown in FIG. 2, a user simply orients each support leg 12 of the tripod 10 in a vertical up-down orientation and depresses release button 48. By doing so, the lower secondary leg portion 18 and the intermediate leg portion 20 will fall out of the upper primary leg portion 16 by way of gravity. Alternatively, if a vertical orientation is not desired or possible, the user pulls out each leg portion until the desired length is achieved. By using the former method where each support leg is vertically orientated, a user can rapidly setup each support leg 12 to a desired length. Once the desired length of the support leg 12 is achieved, the first lock clamp 22 and the second lock clamp 24 can be reengaged to lock the support leg 12 at the desired length.

To collapse each support leg 12 from the open configuration to the closed configuration, a user first unlocks the first lock clamp 22 and the second lock clamp 24. Then, assuming again an up and down vertical orientation, the user simply pushes the secondary leg portion 18 up towards the upper primary leg portion 16 until a locking 'click' is heard or felt. At this point, the latch mechanism 28 has automatically locked the position of the secondary leg portion 18 and the position of the intermediate leg portion 20 relative to the upper primary leg portion 16 and the closed configuration is automatically achieved.

When using the rotor 80 described in FIGS. 6-8, a user simply rotates rotor 80 when the tripod is in the packed configuration shown in FIG. 7 so that each of the three latch mechanisms 28 activate simultaneously. This results in all the support legs 12 being unlocked so that they can reach their desired lengths in one movement. Once each support leg has reached its desired length, the locking clamps 22 and 24 can be engaged to lock adjacent leg portions in their relative positions. Accordingly, a setup of a tripod 10 is substantially quicker than prior art tripods.

Whereas each support leg 12 of the illustrated tripod includes a primary, a secondary and an intermediate leg portion, the present invention is equally applicable to support legs with four leg portions. Under these circumstances, the latch mechanism according to present invention locks the lowermost leg portion with the upper most leg portion, notwithstanding the number of leg portions in between. Indeed, the present invention is applicable to support legs with two or more leg portions.

Moreover, those familiar with the art will appreciate that the present invention is also applicable to monopods where only a single support leg is provided, or bipods where two support legs are provided. Similarly, the present invention may be applicable to support devices with any number of support legs. In reality, the present invention can also be used on any support device and is not limited to the field of camera use.

It should be appreciated that by removing the step of having to re-engage the locking clamps when the closed configuration is established, the pack up time for a tripod or monopod using the support legs 12 of the present invention is substantially reduced. Similarly, by removing the step of disengaging the locking clamps during leg extension, the setup time a tripod or monopod using the support legs 12 of the present invention is also substantially reduced. Moreover, by removing these steps, both the pack up and set of process is substantially more convenient, requires less physical exertion, and less physical bending over by the user to access the clamps.

The present invention is advantageously suited to professional videographers where the subject matter sometimes moves away very quickly. Under these circumstances, less physical exertion and reduced time for setup and pack up can be extremely beneficial, especially considering that tripods used in these applications can be relatively heavy.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this Description, with each claim standing on its own as a separate embodiment of this invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

While there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A support leg for supporting a camera or other device, said support leg including:
    a primary leg portion;
    a secondary leg portion in movable engagement with said primary leg portion for movement between an open configuration where said support leg is fully extended, and a closed configuration where said support leg is fully closed; and
    a latch mechanism, wherein movement of said secondary leg portion to said closed configuration activates said latch mechanism thereby automatically locking the position of said secondary leg portion relative to said primary leg portion to maintain said closed configuration,
    wherein said latch mechanism includes a release button for unlocking the position of said secondary leg portion relative to said primary leg portion when in said closed configuration.

2. The support leg according to claim 1, wherein said latch mechanism includes a latch plate disposed in one of said leg portions.

3. The support leg according to claim 2, wherein said latch plate is laterally movable between a rest state and an actuated state and wherein said latch mechanism includes a spring for biasing said latch plate into said rest state.

4. The support leg according to claim 2 including a lever mechanism for unlocking the position of said secondary leg portion relative to said primary leg portion when in said closed configuration.

5. The support leg according to claim 4, wherein said lever mechanism is engageable with said latch plate.

6. The support leg according to claim 2, wherein said latch mechanism includes a finger member axially extending from one of said leg portions, said finger member being engageable with said latch plate.

7. The support leg according to claim 6, wherein said latch plate is disposed at one end of said primary leg portion, and wherein said finger member axially extends from one end of one of said secondary leg portion.

8. The support leg according to claim 6, wherein said finger member includes an elongate shaft extending to a head formation.

9. The support leg according to claim 8, wherein said latch plate includes a finger aperture, said finger member being resiliently and slidably engageable with said finger aperture as said secondary leg portion approaches said closed configuration.

10. The support leg according to claim 9, wherein upon reaching said closed configuration, said elongate shaft is received by said finger aperture and wherein said head formation substantially rests against said latch plate thereby retaining said finger member with respect to said latch plate.

11. The support leg according to claim 10, wherein upon actuation of said release button said latch plate moves from said rest state to said actuation state.

12. The support leg according to claim 10, wherein in said actuation state, said tapered head formation no longer rests against said latch plate thereby no longer retaining said finger member respect to said latch plate.

13. The support leg according to claim 1 including one or more supplemental leg portions disposed between said primary and secondary leg portions.

14. The support leg according to claim 1, including one or more locking clamps for locking the relative positions of adjacent leg portions.

15. A tripod including:
a base;
three support legs according to claim 1, said support legs being in hinged engagement with said base.

16. The tripod according to claim 15, wherein said base includes an angularly rotatable rotor.

17. The tripod according to claim 16, wherein said rotor includes three circumferentially and equally spaced actuation lugs radially extending from its outer surface, wherein each lug is engageable with one lever mechanism upon rotation of said rotor.

18. The tripod according to claim 17, wherein said rotor includes a spring for resiliently biasing the rotation of said rotor.

19. A monopod including the support leg according to claim 1.

* * * * *